May 29, 1951     A. B. GEHM     2,554,734
COOKY PRESS
Filed Nov. 10, 1949
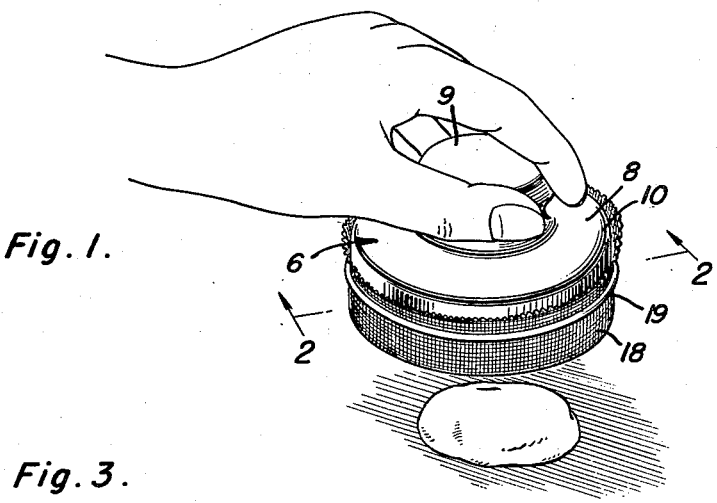
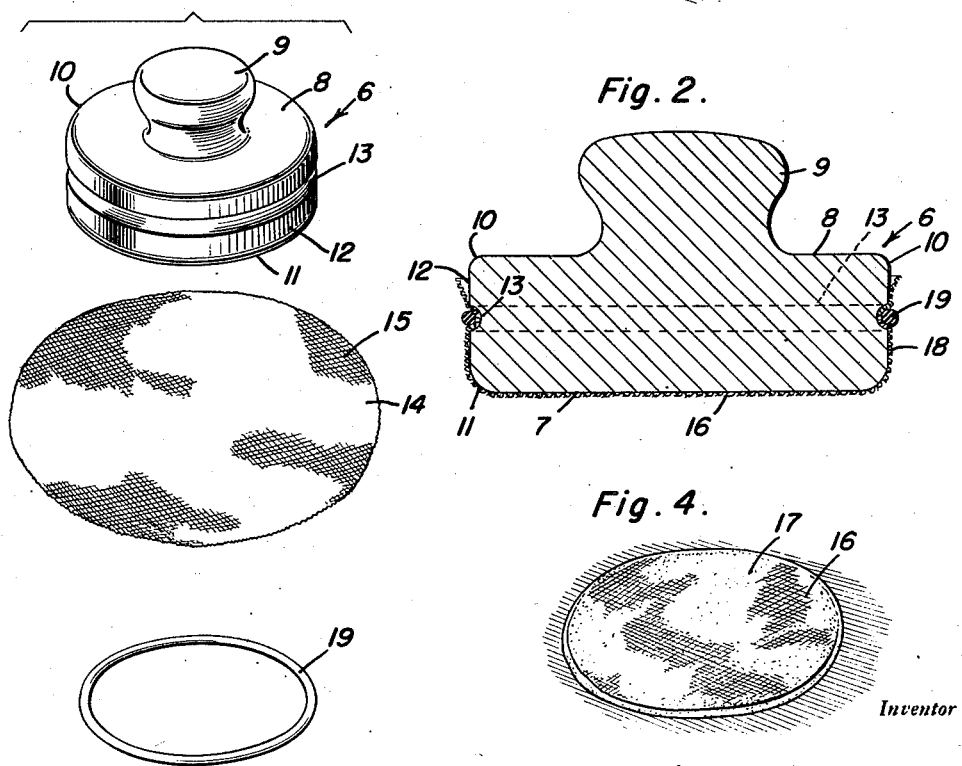
Inventor
Aurelia B. Gehm
By *Clarence A. O'Brien and Harvey B. Jacobson*
Attorneys Patented May 29, 1951

2,554,734

UNITED STATES PATENT OFFICE 2,554,734

COOKY PRESS

Aurelia B. Gehm, Bonduel, Wis.

Application November 10, 1949, Serial No. 126,620

1 Claim. (Cl. 107—47)

The present invention relates to certain new and useful improvements in a hand implement which may be properly classified as a cooky press.

An object of the invention is to provide a simple, practical and conveniently usable press whose use speeds up the procedure of shaping the dough for placement on the usual cooky sheet.

Ordinarily, the cooky dough is pressured into the desired flat sheet form through the use of a rolling pin. Then, a hand-manipulable cutter is employed to give the desired shape and dimensions to the cut-out, and of course many varieties and styles of cooky cutters are in vogue.

The purpose of the present invention is to provide a simple and expedient knob-equipped block or body which has a flat face and which constitutes a satisfactory press, there being a cloth covering attachable to said press to facilitate performance of the steps comprising the improved cooky making method.

Instead of having to spread and flatten the dough by using the conventional rolling pin and then having to cut out the so-called cookies, the simpler method herein followed enables the user to pinch a small wad of dough from the main hunk or batch and to bring the press down on it and to squeeze it and flatten it into disk-like form ready for the cooky sheet.

A further object of the invention is to provide a simple and economical wooden or equivalent knob-equipped block, the latter being cylindrical in cross-section and having a peripheral portion which is grooved to facilitate the steps of fastening and maintaining a fabric covering over the pressure face of the block, said covering serving to impart a fabric-like surface to the cooky when the latter is cooked. Finally, the stated fabric covering is desirable in that it may be wetted before it is applied to the block, whereby to come in handy in picking up sugar for conveniently sugaring the surface of the cooky.

Other objects and advantages will become more readily apparent from the following description and the accompanying illustrative drawings.

In the accompanying sheet of drawings, wherein like numerals are employed to designate like parts throughout the views:

Figure 1 is a perspective view illustrating the improved cooky-making press and showing the manner in which same is used;

Figure 2 is a central vertical sectional view taken approximately on the plane of the line 2—2 of Figure 1, looking in the direction of the arrows;

Figure 3 is an exploded or group perspective view showing the essential elements which go to make up the cooky press; and Figure 4 is a perspective view showing how the finished cooky will look.

Referring now to the drawing by distinguishing reference numerals and accompanying lead lines, the body representing the essential element of the invention may be glass, enamel, commercial plastics, or aluminum, but is preferably a solid block of wood about one inch thick and three inches in diameter. The main body portion is cylindrical in cross-section and is denoted by the numeral 6. It has a flat bottom 7 and a suitably shaped top 8 which is also usually flat. At its center, the top is formed into a handle or knob 9. The corner portions are suitably chamfered or rounded as at 10 and 11 and the peripheral portion 12 is provided with an endless channel or groove 13 midway between the top and bottom surfaces 7 and 8.

The fabric covering 14 is preferably in the form of a cut-out disk and includes a coarse pattern 15 which imparts a corresponding surface pattern 16 on the finished cooky 17, as shown in Figure 4. Actually, the cloth used may be of an open-work construction similar to that employed in fabricating so-called kitchen dishcloths. The size of the disk is such that the edge portions may be cupped up and around the peripheral edge portion of the wooden block as shown in Figures 1 and 2 and as denoted at 18. Then and in addition, a rubber band 19 is placed around the cupped portion of the fabric to lodge and retain same in the groove 13. The cloth is detachable so that it may be removed from time to time and washed. Makeshift pieces available in the home may be employed; or said "covers" may be preconstructed, under which circumstances the cloth would be made in cap form with the edge portion of the cloth formed with a hem and containing a suitable elastic element (not shown). Primarily, however, a coarse fabric covering which is detachably mounted on the block is the important factor to take into account.

In practice, one may omit the usual rolling and cutting steps which are allegedly distasteful to most housewives. Instead, a ball or wad of cooky dough, which is pinched from the main batch, is placed on the cooky sheet, as shown in Fig. 1 of the drawings. Then the device is pressed forcibly down against the dough or patted, if preferred. Before squeezing the wad of dough, however, it is advisable to remove the cloth covering if it is dry and to dampen it slightly with cold water. Then it is replaced so that it may be dipped in sugar to cause the sugar to adhere due to the dampness of the cloth. In so doing, the wad of dough is quickly and conveniently squeezed and flattened out to the desired cooky shape and is therefore "rolled," sugared and decorated (from the coarse material of the fabric) in a single operation.

The fabric covering herein referred to and shown is not to be construed as coarse or openwork, for, obviously, it may be, where required, comparatively fine textured. Then, too, while the block lends itself to production from wood, glass or commercial plastics may be satisfactorily used.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A cooky maker comprising a solid block having a flat circular imperforate bottom and provided on its top with a centralized knob, the peripheral edge portion of said block having an endless groove, a piece of cloth covering said flat bottom, the marginal edge portions of said cloth being cupped and surrounding said peripheral edge portion and extending up over the groove, and a rubber band wrapped around said marginal edge portions so as to seat and hold said cloth in said groove, said cloth being of absorbent material so that when it is wetted it may be dipped in sugar, whereby a wad of dough may be compressed to desired shape and thinness, sugared and decorated in a singe operation.

AURELIA B. GEHM.

REFERENCES CITED

The following references are of record in the file of this patent:

UNITED STATES PATENTS

| Number | Name | Date |
| --- | --- | --- |
| 161,464 | Williams | Mar. 30, 1875 |
| 1,538,575 | Mosman | May 19, 1925 |